US010406058B2

(12) United States Patent
Kim et al.

(10) Patent No.: US 10,406,058 B2
(45) Date of Patent: Sep. 10, 2019

(54) ELECTRONIC DEVICES OPERATING COOPERATIVELY AND CONTROL METHOD OF THE ELECTRONIC DEVICES

(71) Applicant: Samsung Electronics Co., Ltd., Suwon-si, Gyeonggi-do (KR)

(72) Inventors: Kyung-Rock Kim, Yongin-si (KR); Keehong Seo, Seoul (KR); Youngbo Shim, Seoul (KR); Jongwon Lee, Suwon-si (KR); Bokman Lim, Yongin-si (KR); Seungyong Hyung, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 39 days.

(21) Appl. No.: 15/877,466

(22) Filed: Jan. 23, 2018

(65) Prior Publication Data

US 2019/0099317 A1 Apr. 4, 2019

(30) Foreign Application Priority Data

Sep. 29, 2017 (KR) ........................ 10-2017-0127699

(51) Int. Cl.

*A61H 3/00* (2006.01)
*H04W 76/14* (2018.01)
*H04W 84/18* (2009.01)

(52) U.S. Cl.

CPC .............. *A61H 3/00* (2013.01); *H04W 76/14* (2018.02); *H04W 84/18* (2013.01); (Continued)

(58) Field of Classification Search

None
See application file for complete search history.

(56) References Cited

U.S. PATENT DOCUMENTS 8,287,473 B2 * 10/2012 Yasuhara .............. A61F 5/0102 600/587
9,119,762 B2 9/2015 Endo et al.
(Continued)

FOREIGN PATENT DOCUMENTS

KR 101012454 B1 2/2011
KR 101437148 B1 9/2014
(Continued)

*Primary Examiner* — Jason Lin
(74) *Attorney, Agent, or Firm* — Harness, Dickey & Pierce, P.L.C.

(57) ABSTRACT

Electronic devices may determine tasks of interpreting information sensed by sensors, for example, recognition tasks, and operations to be performed by the electronic devices, for example, control tasks, based on types of connected electronic devices. Information sensed by one of the connected electronic devices may be shared with another electronic device, and the other electronic device may perform an operation based on the shared information. A task of interpreting information sensed by a sensor of one of the connected electronic devices may be performed based on a format suitable for being used by another electronic device. Furthermore, the electronic devices may select an electronic device to perform the determined recognition tasks and the determined control tasks based on resource states of the electronic devices.

20 Claims, 15 Drawing Sheets

(52) U.S. Cl.
CPC .. *A61H 2003/007* (2013.01); *A61H 2201/501* (2013.01); *A61H 2201/5058* (2013.01); *A61H 2201/5097* (2013.01)

(56) References Cited

U.S. PATENT DOCUMENTS

| | | | | |
|---|---|---|---|---|
| 2011/0071672 | A1 | 3/2011 | Sanders et al. | |
| 2015/0088269 | A1* | 3/2015 | Roh | A61H 3/00 623/25 |
| 2015/0351995 | A1 | 12/2015 | Zoss et al. | |
| 2016/0346156 | A1* | 12/2016 | Walsh | A63B 21/4009 |
| 2017/0049659 | A1* | 2/2017 | Farris | B25J 9/104 |
| 2018/0325764 | A1* | 11/2018 | Yagi | B25J 11/00 |

FOREIGN PATENT DOCUMENTS

| | | | |
|---|---|---|---|
| KR | 2015/0083331 | A | 7/2015 |
| KR | 2016/0090088 | A | 7/2016 |
| KR | 2016/0097503 | A | 8/2016 |
| KR | 101648270 | B1 | 8/2016 |
| KR | 2016/0112202 | A | 9/2016 |
| KR | 2017/0013060 | A | 2/2017 |

* cited by examiner

ELECTRONIC DEVICES OPERATING COOPERATIVELY AND CONTROL METHOD OF THE ELECTRONIC DEVICES

CROSS-REFERENCE TO RELATED APPLICATION

This application claims under 35 U.S.C. § 119 to Korean Patent Application No. 10-2017-0127699, filed on Sep. 29, 2017, in the Korean Intellectual Property Office, the entire contents of which are incorporated herein by reference in their entirety.

BACKGROUND

1. Field

At least one example embodiment relates to a plurality of electronic devices and/or a method of controlling the plurality of electronic devices.

2. Description of the Related Art

With the onset of rapidly aging societies, an increasing number of people may experience inconvenience and/or pain from joint problems. Thus, there may be a growing interest in walking assistance apparatuses enabling the elderly and/or patients having joint problems to walk with less effort. When walking assistance apparatuses to be attached to different parts are coupled to each other, batteries included in the walking assistance apparatuses may be used separately.

SUMMARY

Some example embodiments relate to a method of controlling electronic devices.

In some example embodiment, the method includes detecting a presence of the electronic devices at relatively different positions; determining operations performable by the electronic devices based on connection information associated with the detected electronic devices; obtaining information associated with the operations from the electronic devices; and performing the operations based on the obtained information.

In some example embodiment, the detecting the presence comprises: generating the connection information including flags arranged based on types of the electronic devices, the flags indicating whether the electronic devices are connected to each other.

In some example embodiment, the determining the operations comprises: selecting one of the electronic devices to perform a computation associated with the operations based on resource states of the electronic devices.

In some example embodiment, the obtaining the information comprises: obtaining the information from a first sensor and a second sensor, the first sensor being associated with a first electronic device of the electronic devices and the second sensor being associated with a second electronic device of the electronic devices.

In some example embodiment, the performing the operations comprises: determining whether to perform the operations based on connection states included in the connection information.

Some other example embodiments relate to a method of controlling an electronic device.

In some example embodiment, the method includes detecting another electronic device connected to the electronic device; identifying an operation performable by the electronic device and the another electronic device; obtaining information associated with the operation from a first sensor and a second sensor, the first sensor being associated with the electronic device and the second sensor being associated with the another electronic device; and performing the operation based on the obtained information.

In some example embodiment, the detecting comprises: determining connection information, the connection information indicating whether the another electronic device is connected to the electronic device based on a type of the another electronic device.

In some example embodiment, the detecting comprises: transmitting the connection information to the another electronic device.

In some example embodiment, the detecting comprises: detecting the another electronic device connected to the electronic device based on connection information received from the another electronic device.

In some example embodiment, the identifying the operation comprises: selecting one of the electronic device and the another electronic device to perform a computation associated with the operation based on resource states of the electronic device and the another electronic device.

In some example embodiment, the information obtained from the first sensor and the second sensor relate to environments surrounding the first sensor and the second sensor, respectively.

In some example embodiment, the obtaining comprises: transmitting the information to the another electronic device.

In some example embodiment, the performing the operation comprises: measuring a connection state between the electronic device and the another electronic device to perform the operation.

Some example embodiments relate to an electronic device.

In some example embodiment, the electronic device includes a first sensor; a communicator configured to communicate with another electronic device connected to the electronic device; and a controller configured to control the electronic device by, identifying an operation performable by the electronic device and the another electronic device, obtaining information associated with the operation from the first sensor included in the electronic device and a second sensor associated with the another electronic device, and performing the operation based on the obtained information.

In some example embodiment, the controller is configured to determine connection information, the connection information indicating whether the another electronic device is connected to the electronic device based on a type of the another electronic device.

In some example embodiment, the communicator is configured to transmit the connection information to the another electronic device.

In some example embodiment, the controller is configured to select one of the electronic device and the another electronic device to perform a computation associated with the operation based on resource states of the electronic device and the another electronic device.

In some example embodiment, the information obtained from the first sensor and the second sensor relate to environments surrounding the first sensor and the second sensor, respectively.

In some example embodiment, the controller is configured to transmit, via the communicator, the information to the another electronic device.

In some example embodiment, the communicator is configured to transmit an identifier of the electronic device to the another electronic device.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
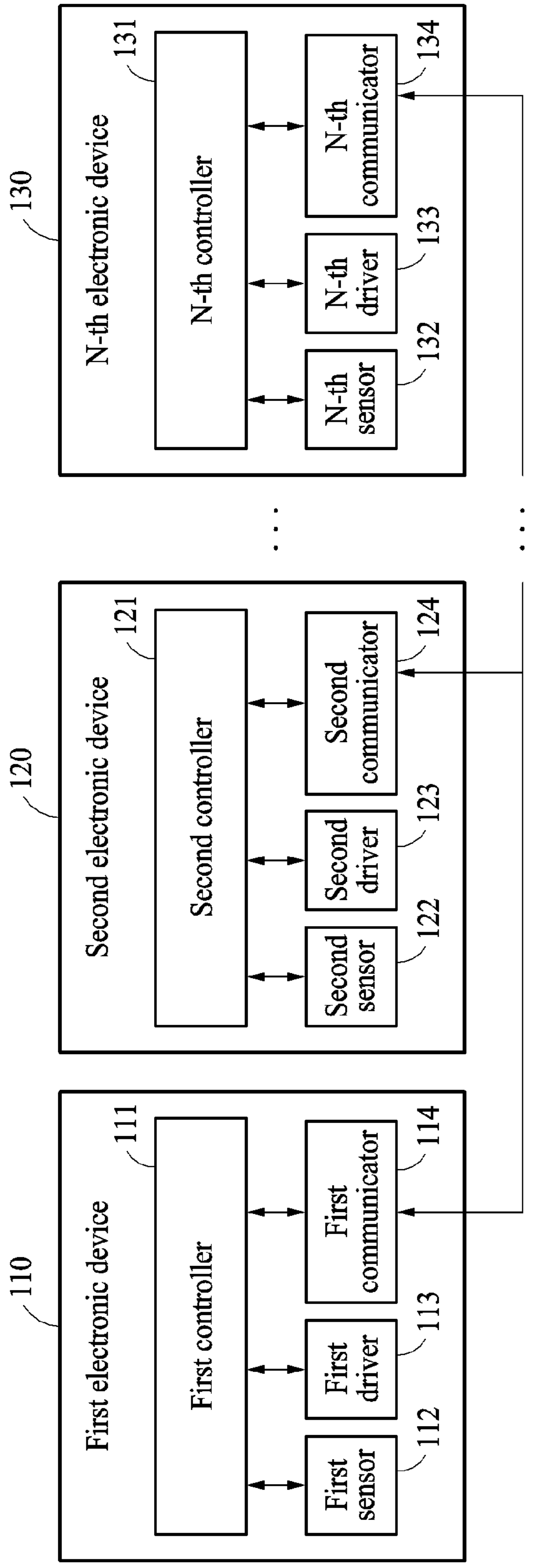
FIG. 1 illustrates structures of electronic devices according to at least one example embodiment.

Specific structural or functional descriptions are provided in the present disclosure to describe examples. The examples may be modified and implemented in various forms, and the scope of the examples is not limited to the descriptions provided in the present specification.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

At least one example embodiment set forth hereinafter may be implemented as any of various types of products such as a personal computer, a laptop computer, a tablet computer, a smart phone, a television, a smart home appliance, an intelligent vehicle, a kiosk, and a wearable device. For example, the at least one example embodiment may be applied to a smart phone, a mobile device, or a smart home system to authenticate a user. The at least one example embodiment may be applied to a payment service through user authentication. Further, the at least one example embodiment may be applied to an intelligent vehicle system that automatically starts by authenticating a user. Hereinafter, the at least one example embodiment will be described in detail with reference to the accompanying drawings, wherein like drawing reference numerals are used for like elements.

FIG. 1 illustrates structures of electronic devices according to at least one example embodiment. Hereinafter, an example in which electronic devices cooperatively operate will be described with reference to FIG. 1.

Referring to FIG. 1, a system may include N electronic devices including a first electronic device 110, a second electronic device 120, . . . , and an N-th electronic device 130.

Each of the N electronic devices may be a device configured to perform a function corresponding to a design intent using power, and may include a battery that supplies the power.

Each of the N electronic devices may include a driver configured to perform the function using the power provided from the battery. For example, the first electronic device 110 may include a first driver 113, the second electronic device 120 may include a second driver 123, and the N-th electronic device 130 may include an N-th driver 133. Each of the drivers may include any one or any combination of electrical elements to be used to perform the function, for example, an electronic circuit, a motor, a display, a touch screen, a light emitting diode (LED), and a speaker. Hereinafter, for ease of description, a driver included in a k-th electronic device will be referred to as a k-th driver.

Furthermore, the electronic device may include a sensor configured to collect information related to a surrounding environment, to perform the function in view of the surrounding environment. For example, the first electronic device 110 may further include a first sensor 112, the second electronic device 120 may further include a second sensor 122, and the N-th electronic device 130 may further include an N-th sensor 132. Each of the sensors may include a sensor configured to output an electrical signal indicating a state of a surrounding environment to be measured, for example, any one or any combination of a microphone, an image sensor, an acceleration sensor, a gravity sensor, a terrestrial magnetism sensor, an illuminance sensor, and a gyro sensor. Hereinafter, a sensor included in the k-th electronic device will be referred to as a k-th sensor.

The N electronic devices may cooperatively perform the function. For example, the N electronic devices may be apparatuses to be attached to different body parts of a user to assist motions of the user, for example, walking assistance apparatuses. In this example, the N electronic devices may perform a function to assist the motions of the user based on types of the electronic devices attached to the user. For example, in a case in which the N electronic devices are attached to knees and a pelvis of the user, the N electronic devices may cooperatively assist a walking motion of the user. In another example, the N electronic devices may be electronic devices utilizing the Internet of Things (IoT), the electronic devices to be disposed at different locations and configured to cooperatively operate while sharing information collected at the different locations. In still another example, the N electronic devices may be modular robots configured to operate separately, and may cooperatively perform a function instructed by an administrator.

The N electronic devices may be connected to each other in a wireless or wired manner to cooperatively perform the function. The electronic devices may each include a communicator configured to communicate with another electronic device. Hereinafter, for ease of description, a communicator included in the k-th electronic device will be referred to as a k-th communicator. For example, the first electronic device 110 may further include a first communicator 114, the second electronic device 120 may further include a second communicator 124, and the N-th electronic device 130 may further include an N-th communicator 134. Each of the communicators may include transmitters and/or receivers that include hardware and any necessary software to communicate with other ones of the electronic devices based on a Bluetooth network, a near field communication (NFC) network, a wireless-fidelity (WiFi) network, an Ethernet for control automation technology (EtherCAT), or a controller area network (CAN).

The N electronic devices each include a memory (not shown) and a controller.

The memory (not shown) may include at least one of a volatile memory, non-volatile memory, random access memory (RAM), a flash memory, a hard disk drive, and an optical disk drive.

The controller may include processing circuitry. The processing circuitry may be, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processing circuitry may be configured, through a layout design or execution of computer readable instructions stored in the memory (not shown), as a special purpose computer to control the sensor, the driver, and the communicator of the respective electronic device to cooperatively perform the function. Therefore, the controllers may improve the functioning of the electronic devices themselves by cooperatively assisting the user without hierarchical designation among the electronic devices.

Hereinafter, for ease of description, a controller included in the k-th electronic device will be referred to as a k-th controller. For example, the first electronic device 110 may further include a first controller 111, the second electronic device 120 may further include a second controller 121, and the N-th electronic device 130 may further include an N-th controller 131.

The first controller 111 may share information related to a surrounding environment of the first electronic device 110 collected by the first sensor 112 with one or more of the second electronic device 120 through the N-th electronic device 130 such that the first electronic device 110 through the N-th electronic device 130 may perform the function in view of the surrounding environment of the first electronic device 110. The first controller 111 may control the first driver 113 based on information collected by at least one of the second sensor 122 through the N-th sensor 132, in addition to the information related to the surrounding environment of the first electronic device 110 collected by the first sensor 112, thereby enabling the function to be performed in view of all the surrounding environments of the first electronic device 110 through the N-th electronic device 130. The first controller 111 may collect information to be used to control the first driver 113 through the first communicator 114 from other electronic devices, for example, the second electronic device 120 through the N-th electronic device 130.

Figure 2:
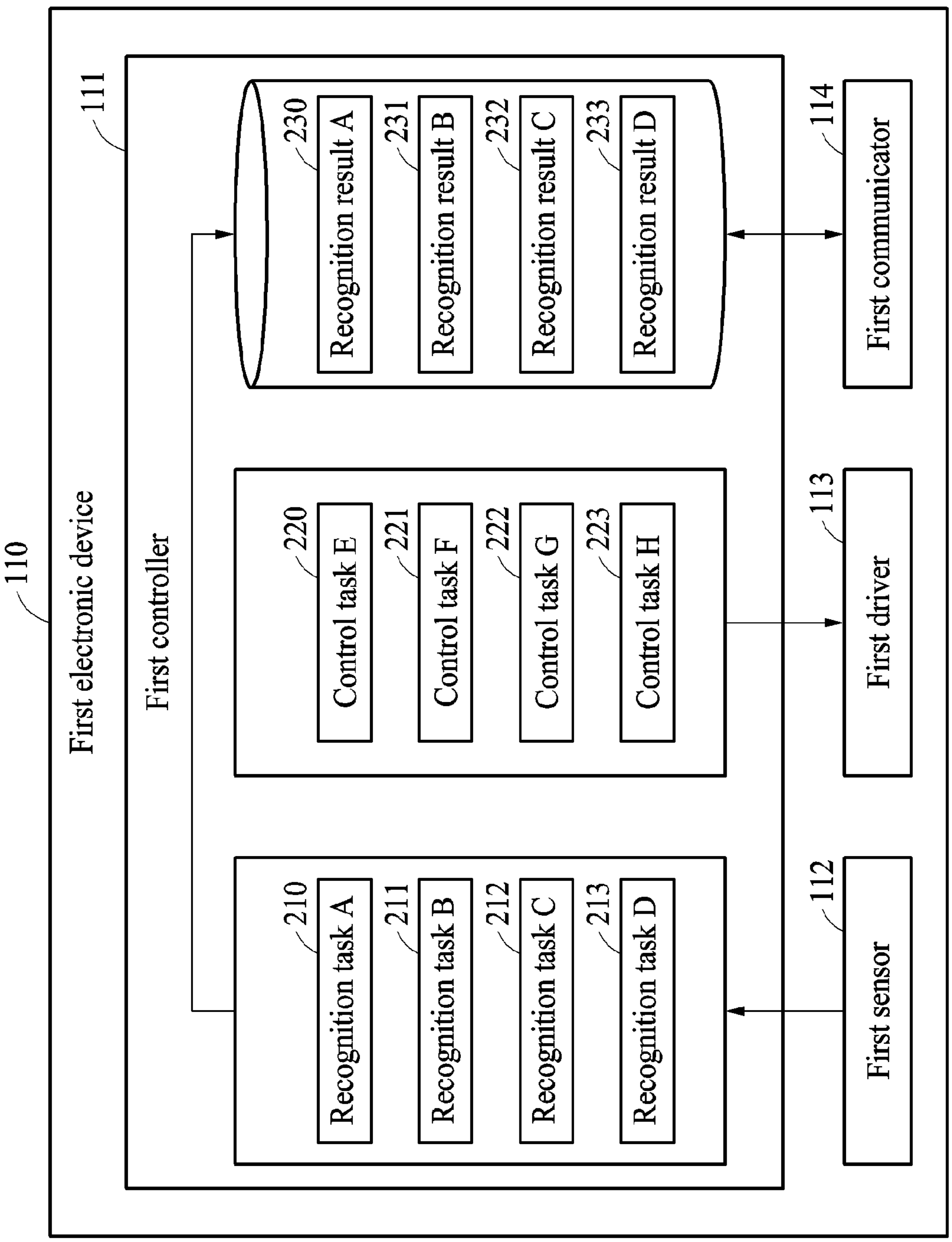
FIG. 2 illustrates a process of a first electronic device operating cooperatively with a second electronic device through an N-th electronic device of FIG. 1.

FIG. 2 illustrates a process of the first electronic device 110 operating cooperatively with the second electronic device 120 through an N-th electronic device 130 of FIG. 1. Hereinafter, a process of the first controller 111 of the first electronic device 110 operating cooperatively with other electronic devices will be described in detail with reference to FIG. 2.

Referring to FIG. 2, the first controller 111 may perform an operation of recognizing a surrounding environment, hereinafter, a recognition task, based on a signal output from the first sensor 112 using a desired (or, alternatively, a preset) algorithm. That is, the recognition task refers to a process of generating information, that is, a recognition result, to be used for the electronic devices to cooperatively operate from the signal collected by the first sensor 112. The first controller 111 may select and perform any one or any combination of a recognition task A 210 through a recognition task D 223, thereby generating a recognition result to be used to operate the first electronic device 110 and other electronic devices connected to the first electronic device 110 from the signal output from the first sensor 112. Program codes or libraries to perform the recognition task A 210 through the recognition task D 223 may be stored in the first electronic device 110 and all types of other electronic devices to be connected to the first electronic device 110.

The recognition task A 210 through the recognition task D 223 may generate different pieces of information from the signal output from the first sensor 112. That is, the first controller 111 may select and perform any one or any combination of the recognition task A 210 through the recognition task D 223, thereby interpreting the signal of the first sensor 112 in a different manner. For example, the first electronic device 110 may be an apparatus to be attached to an ankle of the user to assist a motion of the ankle, and the first sensor 112 may measure an angle between a top of a foot and a shank as the motion of the ankle of the user. In this example, the first controller 111 may calculate a working range of the ankle by performing the recognition task A 210. Further, the first controller 111 may calculate a periodic motion of the angle in a situation in which the user walks by performing the recognition task B 211.

Hereinafter, pieces of information generated by the recognition task A 210 through the recognition task D 223 will be referred to as a recognition result A 230 through a recognition result D 233, respectively. The recognition result A 230 through the recognition result D 233 may be stored in a memory included in the first electronic device 110 or the first controller 111. In a case in which the first controller 111 selects and performs any one or any combination of the recognition task A 210 through the recognition task D 223, a recognition result corresponding to the selected recognition task, among the recognition result A 230 through the recognition result D 233, may be stored in the memory. The first controller 111 may receive, through the first communicator 114, a recognition result generated by another electronic device connected to the first electronic device 110, and store the received recognition result in the memory.

The first controller 111 may perform an operation of generating a control signal to control the first driver 113 from the collected recognition result, hereinafter, a control task, using a desired (or, alternatively, a preset) algorithm. That is, the control task refers to a process of generating the control signal to control the first driver 113 based on information collected from a plurality of electronic devices including the first electronic device 110. The first controller 111 may select and perform any one or any combination of the control task E 220 through the control task H 223. The first controller 111 may select any one or any combination of the control task E 220 through the control task H 223 based on types of other electronic devices connected to the first electronic device 110. Program codes or libraries to perform the control task E 220 through the control task H 223 may be stored in the first electronic device 110 and all types of other electronic devices to be connected to the first electronic device 110.

The control task may generate a control signal with respect to a driver based on a recognition result. The control task E 220 through the control task H 223 may generate control signals using different recognition results. For example, the control task E 220 may generate a control signal using only the recognition result A 230, the control task F 221 may generate a control signal using the recognition result A 230 through the recognition result C 232, and the control task G 222 may generate a control signal using the recognition result C 232.

The control task E 220 through the control task H 223 may generate different control signals using different recognition results based on operations to be performed through the control tasks. For example, the control task E 220 may generate a control signal using only the recognition result A 230, and the control task F 221 may generate a control signal using the recognition result A 230 through the recognition result C 232.

The operation of the first controller 111 selecting any one or any combination of the recognition task A 210 through the recognition task D 223 and the operation of the first controller 111 selecting any one or any combination of the control task E 220 through the control task H 223 may be performed based on types or the number of other electronic devices connected to the first electronic device 110. The plurality of recognition tasks and the plurality of control tasks may be dynamically combined based on connection states of the electronic devices. To select a recognition task and a control task, the first controller 111 may need to detect an electronic device connected to the first electronic device 110. The plurality of electronic devices may be horizontally connected without hierarchical distinction.

Figure 3:
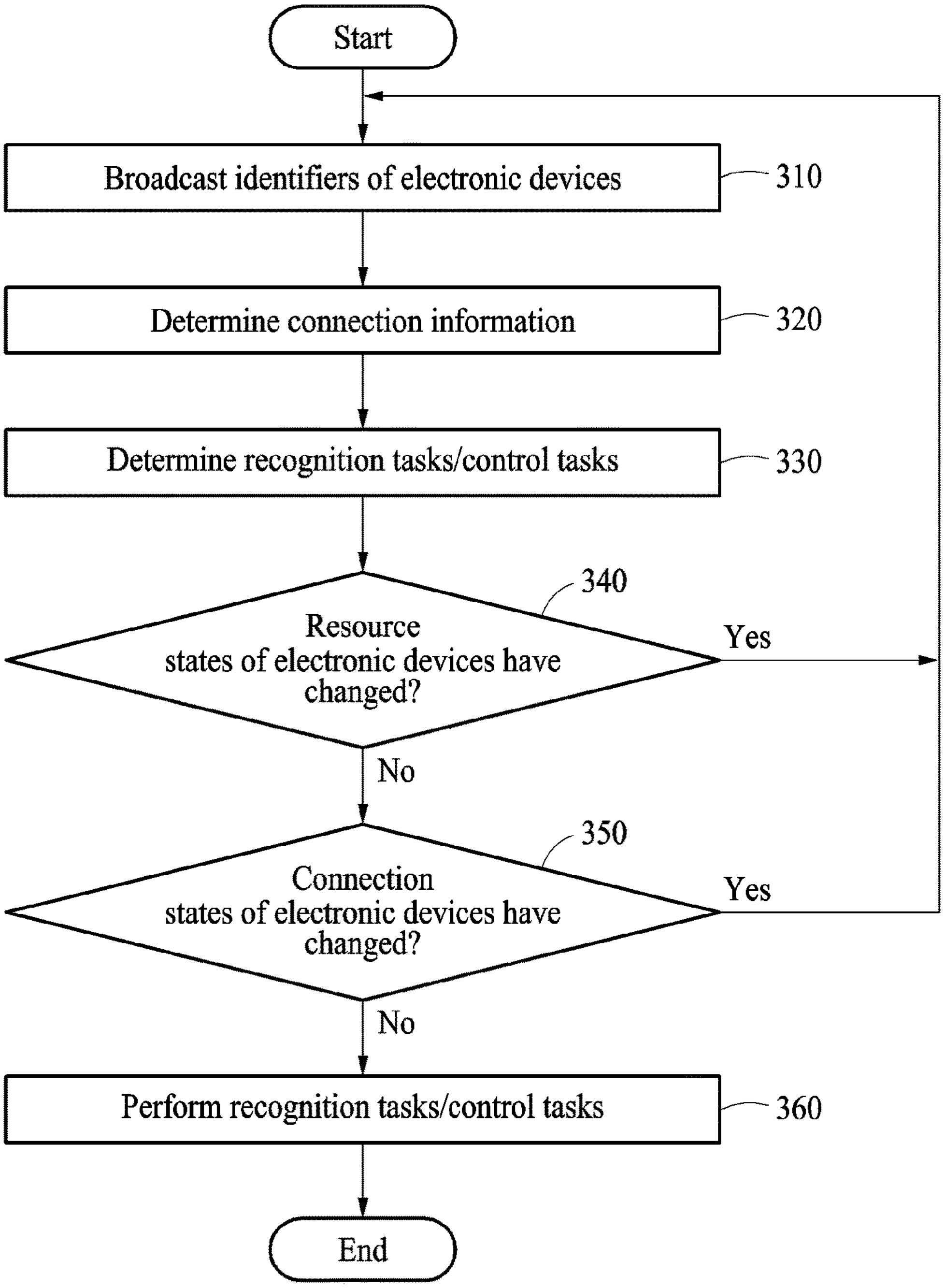
FIG. 3 is a flowchart illustrating an operation of electronic devices cooperatively performing tasks through communication according to at least one example embodiment.

FIG. 3 is a flowchart illustrating an operation of electronic devices cooperatively performing tasks through communication according to at least one example embodiment.

Referring to FIG. 3, in operation 310, each of the electronic devices may broadcast identifiers of the electronic devices when the electronic devices are connected through the wired or wireless network connected. Thus, the electronic devices connected to each other may receive the identifiers of all the electronic devices. The identifiers of the electronic devices may be intrinsic identifiers of the electronic devices or identifiers assigned from the wired or wireless network through which the electronic devices are connected. The electronic devices may broadcast information indicating types of the electronic devices along with the identifiers. The electronic devices may detect each other based on the broadcast identifiers.

In operation 320, each of the electronic devices may determine connection information indicating whether the electronic devices are connected, based on the broadcast identifiers. The connection information may be information indicating whether other connectable electronic devices are connected to an electronic device based on types of the other electronic devices. The connection information may be generated by arranging flags indicating whether the electronic devices are connected to each other based on the types of the electronic devices. The plurality of electronic devices may share the determined connection information, and thus the same connection information may be stored in the electronic devices connected to each other.

In operation 330, each of the electronic devices may determine recognition tasks and control tasks to be performed by the electronic devices based on the connection information. That is, operation of the electronic devices processing information related to surrounding environments collected through sensors, that is, the recognition tasks, and operations to be performed by the electronic devices based on the information related to the surrounding environments, that is, the control tasks, may be determined based on connections of the electronic devices. The recognition tasks and the control tasks to be performed by the electronic devices may be determine based on the connections of the electronic devices and resource states of the electronic devices. The resource states of the electronic devices may include, for example, computing speeds of processors or controllers included in the electronic devices, occupancy rates of the processors or the controllers, capacities of memories included in the electronic devices, or capacities of batteries included in the electronic devices. In summary, the operations to be performed by the electronic devices may be dynamically configured in view of the connection states and the resource states.

In operation 340, each of the electronic devices may determine whether the resource states of the electronic devices have changed after the recognition tasks and the control tasks are determined. In a case in which the resource states of the electronic devices have changed and thus the recognition tasks and the control tasks need to be determined again, the electronic devices may perform operation 330 again.

In operation 350, each of the electronic devices may determine whether the connection states of the electronic devices have changed after the recognition tasks and the control tasks are determined. In detail, the electronic devices may determine whether another electronic device is connected additionally, or whether a portion of the electronic devices is disconnected after the connection information is determined in operation 320. In a case in which another electronic device is connected additionally, or a portion of the electronic devices is disconnected, the electronic devices may return to operation 310 to determine the connection information again.

In operation 360, each of the electronic devices may perform the determined recognition tasks and the determined control tasks, when the resource states and the connection states of the electronic devices have not changed after the recognition tasks and the control tasks are determined.

Thereafter, each of the electronic devices may share recognition results generated based on the determined recognition tasks. The shared recognition results may be utilized for the electronic devices to perform the control tasks. The recognition tasks and the control tasks may be determined based on the connections of the electronic devices, and the recognition results of the electronic devices may be shared among the electronic devices. Thus, the electronic devices may cooperatively perform the control tasks of the electronic devices based on recognition results generated by the other electronic devices.

Figure 4:
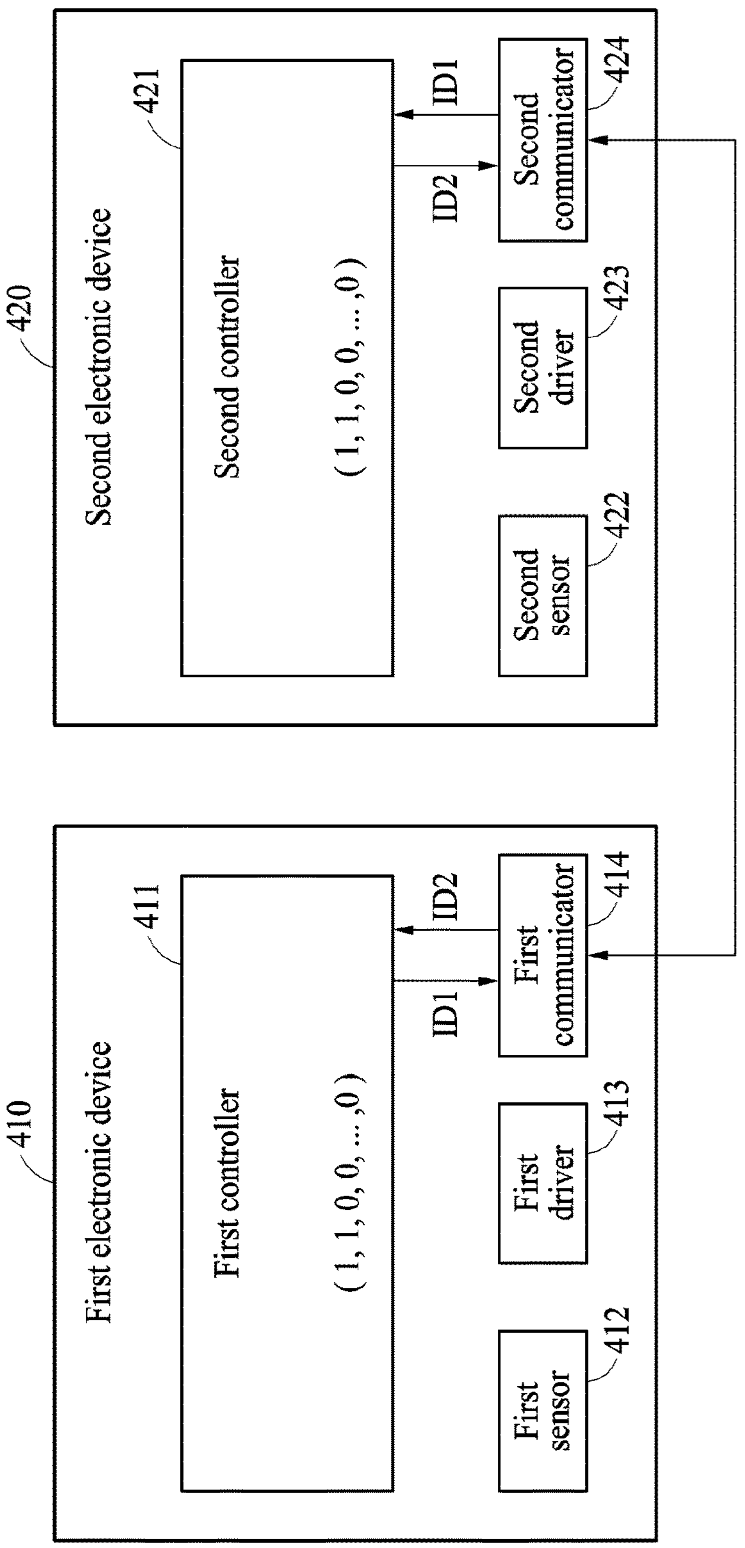
FIG. 4 illustrates an operation of electronic devices determining connection information according to at least one example embodiment.

FIG. 4 illustrates an operation of electronic devices determining connection information according to at least one example embodiment.

Referring to FIG. 4, an operation of a first electronic device 410 and a second electronic device 420 determining connection information will be described with reference to FIG. 4.

The first electronic device 410 and the second electronic device 420 may manage connection states of electronic devices based on connection information combined with flags indicating whether all connectable electronic devices are connected. The connection information may be expressed as a vector including a k-th element which is a flag indicating whether a k-th electronic device is connected. For example, in a case in which the k-th electronic device is connected, a value of the k-th element of the connection information may be “1”. In a case in which the k-th electronic device is not connected, the value of the k-th element of the connection information may be “0”. In a case in which up to N electronic devices are connectable to each other, a length of the connection information may be “N”. In this example, an initial value of the connection information of the first electronic device 410 may be a vector (1, 0, 0, . . . , 0) with a length “N”. In a situation in which the second electronic device 420 is not connected to any electronic device, an initial value of connection information of the second electronic device 420 may be a vector (0, 1, 0, 0, . . . , 0) with a length “N”.

The first electronic device 410 and the second electronic device 420 may be connected to each other through a wired or wireless network. For example, a user may connect the first electronic device 410 and the second electronic device 420 using a cable, or connect the first electronic device 410 and the second electronic device 420 through pairing. In addition, in a case in which the user turns on the first electronic device 410 and the second electronic device 420, the first electronic device 410 and the second electronic device 420 may broadcast radio signals to inform other electronic devices of presences of the first electronic device 410 and the second electronic device 420. In this example, the first electronic device 410 and the second electronic device 420 may be connected to each other by identifying the radio signal from each other.

The first electronic device 410 and the second electronic device 420 may broadcast identifiers, thereby detecting the presence of each other. For example, a first controller 411 may control a first communicator 414 to broadcast an identifier ID1 of the first electronic device 410. A second controller 421 may control a second communicator 424 to broadcast an identifier ID2 of the second electronic device 420. When the first communicator 414 receives the identifier ID2 of the second electronic device 420, the first controller 411 may change connection information based on the received identifier.

For example, in response to reception of the identifier of the second electronic device 420, the first controller 411 may change a flag (a value of a second element when expressed as a vector) of connection information corresponding to the second electronic device 420. That is, the connection information may be changed from a vector (1, 0, 0, . . . , 0) with a length “N” to a vector (1, 1, 0, . . . , 0). In response to reception of the identifier of the first electronic device 410, the second controller 421 may change a flag (that is, a value of a first element) of connection information of the first electronic device 410. That is, the connection information may be changed from a vector (0, 1, 0, . . . , 0) with a length “N” to a vector (1, 1, 0, . . . , 0). The new connection information may be shared between the first controller 411 and the second controller 421. Thus, the connection information of the first controller 411 and the second controller 421 may be synchronized with each other.

The connection information is information indicating connection states of electronic devices, and thus may be used to determine recognition tasks of processing values of a first sensor 412 and a second sensor 422, and control tasks of controlling a first driver 413 and a second driver 423.

Figure 5:
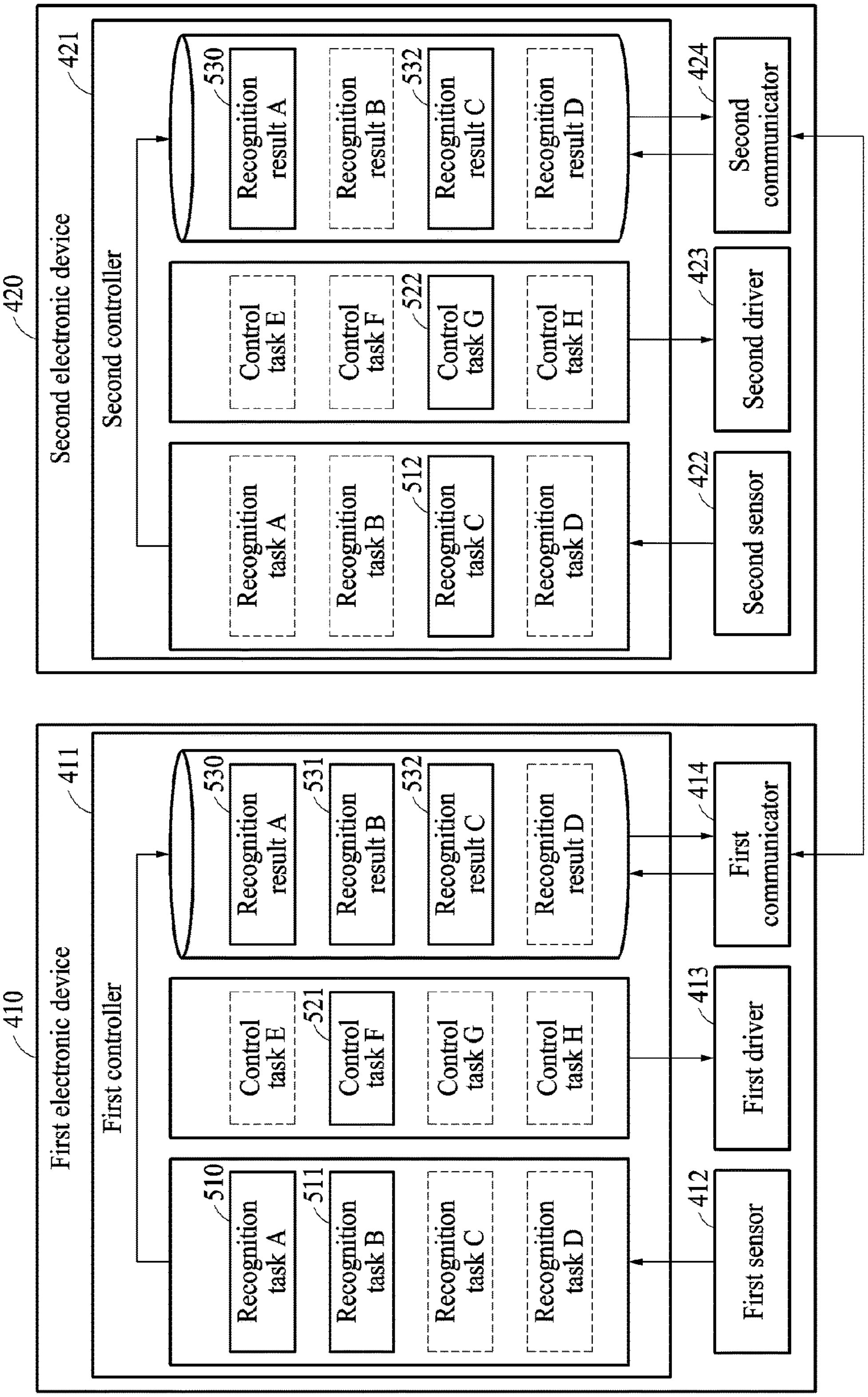
FIG. 5 illustrates an operation of the electronic devices of FIG. 4 performing recognition tasks and control tasks based on determined connection information.

FIG. 5 illustrates an operation of the electronic devices of FIG. 4 performing a recognition task and a control task based on determined connection information.

Referring to FIG. 5, after the first electronic device 410 and the second electronic device 420 determine connection information based on the operation described with reference to FIG. 4, the first electronic device 410 and the second electronic device 420 may perform the recognition task and the control task based on the determined connection information.

The first controller 411 may determine to perform a recognition task corresponding to the determined connection information, among a recognition task A 510 through a recognition task D. That is, the first controller 411 may select a recognition task from a plurality of recognition tasks to generate a recognition result to be used for the first electronic device 410 and another electronic device (in the example of FIG. 5, the second electronic device 420) currently connected to the first electronic device 410 to perform a control task. Furthermore, the first controller 411 may not perform a recognition task to be not used for the first electronic device 410 and the other electronic device (in the example of FIG. 5, the second electronic device 420) currently connected to the first electronic device 410 to perform the control task, among the plurality of recognition tasks. In the example of FIG. 5, the first controller 411 may select the recognition task A 510 and a recognition task B 511 from the recognition task A 510 through the recognition task D.

The second controller 421 may also select a recognition task corresponding to the determined connection information from the recognition task A 510 through the recognition task D. Although the same connection information is determined by the first controller 411 and the second controller 421, the recognition task selected by the first controller 411 may differ from the recognition task selected by the second controller 421. That is because, in a case in which the first sensor 412 and the second sensor 422 include different types of sensors, a task of processing information measured by the first sensor 412 may differ from a task of processing information measured by the second sensor 422. In a case in which the first electronic device 410 and the second electronic device 420 are positioned at different locations, information related to a surrounding environment collected by the first sensor 412 may differ from information related to a surrounding environment collected by the second sensor 422. In the example of FIG. 5, the second controller 421 may select a recognition task C 512 among the recognition task A 510 through the recognition task D.

Similarly, the first controller 411 may determine to perform a control task corresponding to the determined connection information, among a control task E through a control task H. In detail, the first controller 411 may select, from the plurality of control tasks, a control task corresponding to an operation to be performed cooperatively by the first electronic device 410 and the other electronic device (in the example of FIG. 5, the second electronic device 420) currently connected to the first electronic device 410. In the example of FIG. 5, the first controller 411 may select, from the control task E through the control task H, a control task F 521 related to an operation to be performed cooperatively with the second electronic device 420.

The second controller 421 may also select a control task corresponding to the determined connection information from the control task E through the control task H. Although the same connection information is determined by the first controller 411 and the second controller 421, an operation to be performed by the first controller 411 using the first driver 413 may differ from an operation to be performed by the second controller 421 using the second driver 423. Thus, the control task selected by the first controller 411 may differ from the control task selected by the second controller 421. In the example of FIG. 5, the second controller 421 may select, from the control task E through the control task H, a control task G 522 related to an operation to be performed cooperatively with the first electronic device 410.

The first controller 411 may transmit information indicating that that the first controller 411 selects the recognition task A 510, the recognition task B 511, and the control task F 521 to the second controller 421 through the first communicator 414. Similarly, second controller 421 may transmit information indicating that the second controller 421 selects the recognition task C 512 and the control task G 522 to the first controller 411 through the second communicator 424.

The first controller 411 may process the information related to the surrounding environment of the first electronic device 410 collected by the first sensor 412 based on the selected recognition task A 510 and the selected recognition task B 511. The first controller 411 may generate a recognition result A 530 by performing the recognition task A 510 with respect to the information collected by the first sensor 412. The first controller 411 may generate a recognition result B 531 by performing the recognition task B 511 with respect to the information related to the surrounding environment of the first electronic device 410 collected by the first sensor 412. The recognition result A 530 and the recognition result B 531 may be stored in a memory included in the first electronic device 410 or the first controller 411. Similarly, the second controller 421 may process the information related to the surrounding environment of the second electronic device 420 collected by the second sensor 422 based on the selected recognition task C 512. The second controller 421 may generate a recognition result C 532 by performing the recognition task C 512 with respect to the information collected by the second sensor 422. The recognition result C 532 may be stored in a memory included in the second electronic device 420 or the second controller 421.

Since the first controller 411 and the second controller 421 have selected the control tasks corresponding to the operations to be performed cooperatively by the first electronic device 410 and the second electronic device 420 being connected to each other, from the plurality of control tasks, the selected control tasks, for example, the control task F 521 and the control task G 522, may request the recognition results stored in the electronic devices being connected to each other. For example, to perform the control task F 521, the first controller 411 may use the recognition result C 532 generated from the information collected by the second sensor 422, in addition to the recognition result A 530 and the recognition result B 531 generated from the information collected by the first sensor 412. Similarly, to perform the control task G 522, the second controller 421 may use the recognition result A 530 generated from the information collected by the first sensor 412, in addition to the recognition result C 532 generated from the information collected by the second sensor 422.

The first controller 411 and the second controller 421 may share results of selecting the recognition tasks and the control tasks. Thus, the first controller 411 may transmit the recognition result A 530 to be used for the second controller 421 to perform the control task G 522 to the second electronic device 420 through the first communicator 414. The second controller 421 may store the received recognition result A 530 in the memory in which the recognition result C 532 is stored. Through this, the second controller 421 may obtain all the recognition results to be used to perform the control task G 522, for example, the recognition result A 530 and the recognition result C 532. The second controller 421 may control the second driver 423 by performing the control task G 522 based on the obtained recognition results.

Similarly, the second controller 421 may transmit the recognition result C 532 to be used for the first controller 411 to perform the control task F 521 to the first electronic device 410 through the second communicator 424. The first controller 411 may store the received recognition result C 532 in the memory in which the recognition result A 530 and the recognition result B 531 are stored. Through this, the first controller 411 may obtain all the recognition results to be used to perform the control task F 521, for example, the recognition result A 530, the recognition result B 531, and the recognition result C 532. The first controller 411 may control the first driver 413 by performing the control task F 521 based on the obtained recognition results.

In summary, a plurality of electronic devices including drivers to perform operations independently or cooperatively may be connected to each other. Furthermore, a cloud computing based electronic device including a high-performance processor, rather than including a driver or a sensor, to process information fast may be connected.

Figure 6:
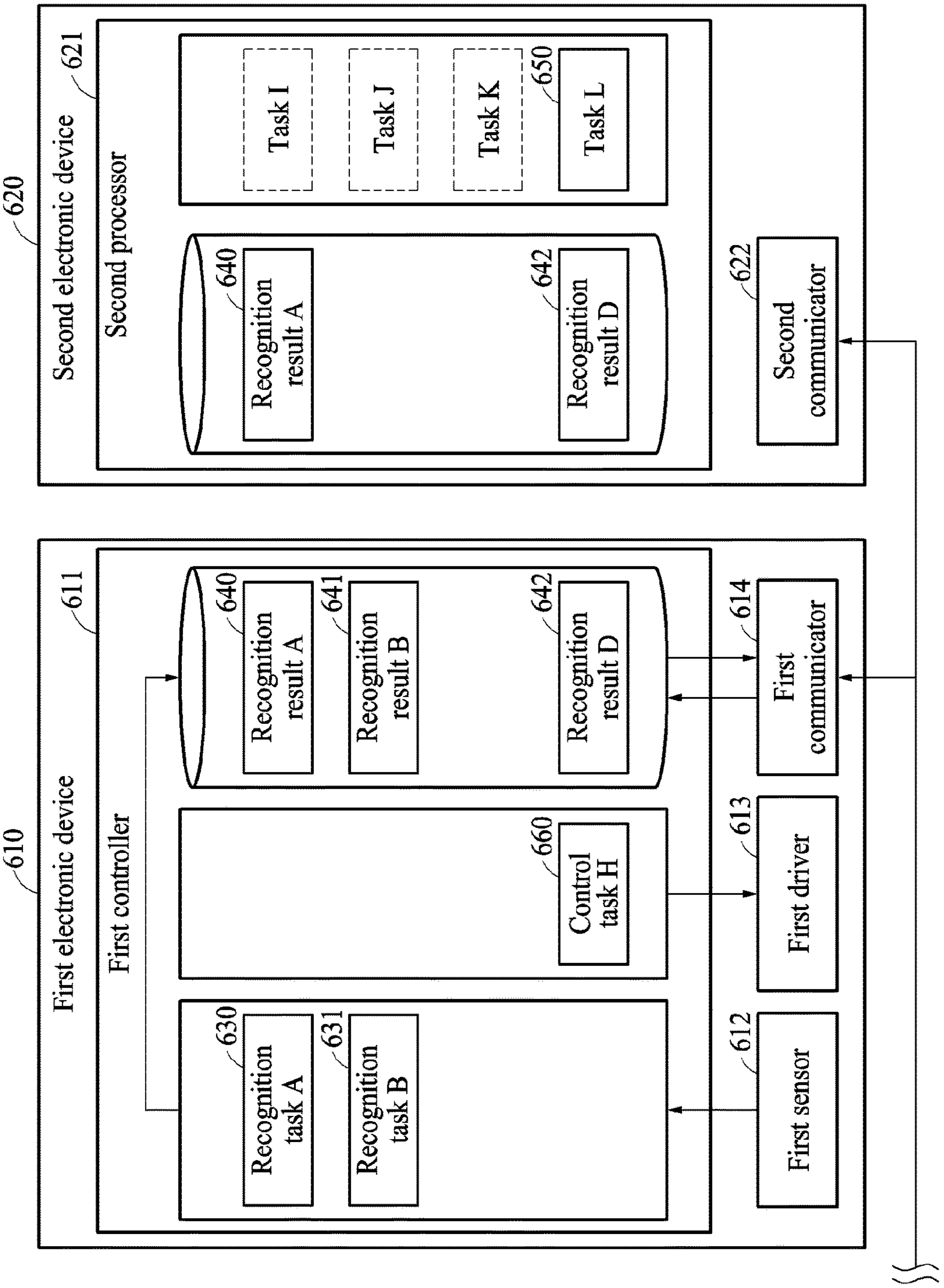
FIG. 6 illustrates an operation of an electronic device processing information from another electronic device fast according to at least one example embodiment.

FIG. 6 illustrates an operation of an electronic device processing information from another electronic device having greater processing capabilities according to at least one example embodiment.

A first electronic device 610 may control a first driver 613 based on information related to surrounding environments collected from a first sensor 612 and other electronic devices connected to the first electronic device 610. The first electronic device 610 may include a first communicator 614 configured to communicate with another electronic device. A first controller 611 included in the first electronic device 610 may process the information related to the surrounding environments collected by the first sensor 612 and the other electronic devices connected to the first electronic device 610 through a recognition task selected based on connection information, and generate a control signal to control the first driver 613 based on the processed information related to the surrounding environments through a control task selected based on the connection information.

A second electronic device 620 may generate information to be used to control other electronic devices from information related to surrounding environments collected by the other electronic devices except for the second electronic device 620. Referring to FIG. 6, the second electronic device 620 may include a second communicator 622 configured to receive recognition results generated through recognition tasks performed by the other electronic devices. The second electronic device 620 may further include a second processor 621 configured to process the received recognition results fast.

In some embodiments, in a case in which the first electronic device 610 is a robot or a machine that actively responds to a surrounding environment, a performance of a processor used by the first controller 611 may be limited by any one or any combination of a power efficiency, a thermal resistance, and a size, to stably perform a recognition task or a control task irrespective of a change in the surrounding environment. In this example, the second electronic device 620 may be an electronic device positioned at a control center of a network of electronic devices or a cloud based server system, and may include the high-performance second processor 621 to overcome the limitation of the performance of the processor included in the first electronic device 610.

In a case in which the first electronic device 610 and the second electronic device 620 are connected to each other, the first electronic device 610 may select a recognition task and a control task in view of the connected second electronic device 620. In the example of FIG. 6, the first electronic device 610 may select a recognition task A 630, a recognition task B 631, and a control task H 660 with respect to the connected second electronic device 620. The second electronic device 620 may include one or more tasks of processing the recognition results collected from the other electronic devices, as tasks to be selected based on connection information. In the example of FIG. 6, the second electronic device 620 may select a task L 650 from a task I through the task L 650 with respect to the first electronic device 610. The task L 650 may include an algorithm to be used for the first electronic device 610 to perform the control task H 660. The task L 650 may include performing computations to operate the first electronic device 610.

The second electronic device 620 perform task L 650 relatively faster than the first controller 611 could, and may generate a recognition result D 642 to be used for the first controller 611 to perform the control task H 660. The second electronic device 620 may perform the task L 650 based on a recognition result A 640 generated by the first controller 611. That is, the second electronic device 620 may generate a recognition result, for example, the recognition result D 642, to be used for an operation of another electronic device, for example, the first electronic device 610, based on a recognition result of the other electronic device, for example, the recognition result A 640. The recognition result D 642 may be transmitted to the first controller 611 through the second communicator 622, and the first controller 611 may store the recognition result D 642 in a memory. Furthermore, the first controller 611 may utilize the recognition result D 642 to perform the control task H 660. Through this, the first electronic device 610 may perform a function corresponding to the control task H 660 with assistance of the high-performance second processor 621 of the second electronic device 620.

In a case in which the second electronic device 620 is connected to a plurality of electronic devices including the first electronic device 610, the second electronic device 620 may perform the task L 650 based on data, so called big data, collected by the plurality of electronic devices. Accordingly, the first electronic device 610 may perform the function corresponding to the control task H 660 more efficiently based on the big data.

As described above, electronic devices may be apparatuses to be worn on different body parts of a user to assist motions of the user, for example, walking assistance apparatuses. Hereinafter, to describe a function to be performed cooperatively by the electronic devices in detail, an example in which the electronic devices are attached to body parts of a user to assist motions of the user will be described further with reference to the drawings.

FIGS. 7A through 7F are views illustrating a user wearing electronic devices on different body parts according to at least one example embodiment.

Figure 7A:
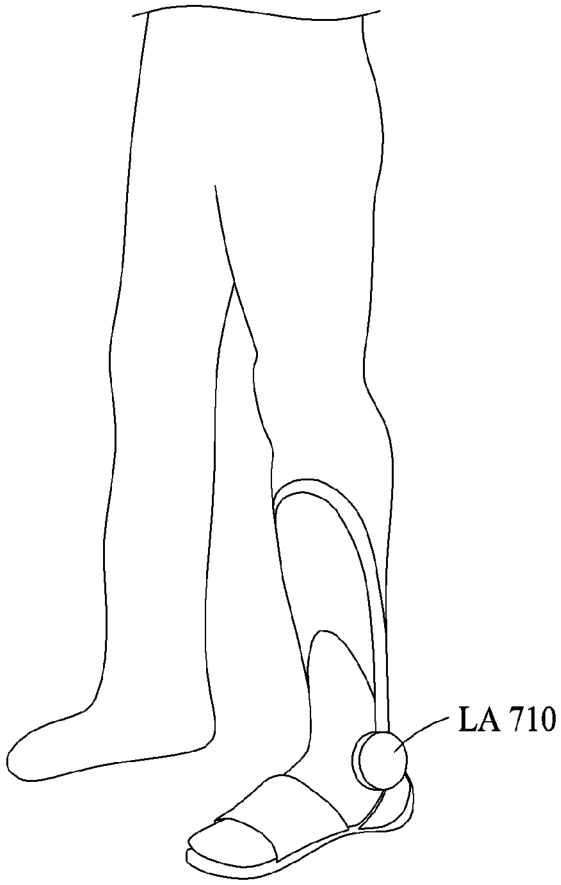
FIGS. 7A through 7F are views illustrating a user wearing electronic devices on different body parts according to at least one example embodiment.

Referring to FIG. 7A, an electronic device LA 710 may be attached to a left ankle of a user to assist a plantar-flexion motion and/or a dorsi-flexion motion of a left ankle joint of the user and/or to support a weight of the user. The electronic device LA 710 may measure a working range of the left ankle or detect whether a left foot lands. In a situation in which the user walks, the electronic device LA 710 may assist a motion of the left ankle to generate a propulsion to be used for the user to walk, or adjust a clearance between the left foot and the ground. In a situation in which the user stands, the electronic device LA 710 may fix or support a pose of the left ankle of the user.

Figure 7B:
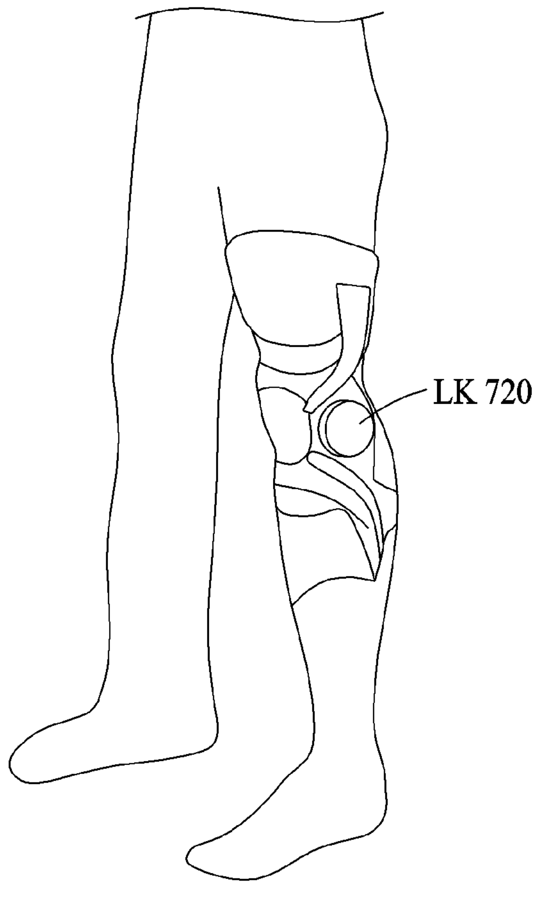

Referring to FIG. 7B, an electronic device LK 720 may be attached to a left knee of the user to assist a flexion motion and/or an extension motion of a left knee joint and/or to absorb an impulse to be applied to the left knee of the user. The electronic device LK 720 may measure a working range of the left knee, or measure an angle between a left thigh and a left shank. In a case in which the user sits or stands, the electronic device LK 720 may change the angle between the left thigh and the left shank to assist a sitting motion or a standing motion of the user. By changing the angle between the thigh and the shank, the electronic device LK 720 may lift down or lift up an upper body above the knee of the user.

Figure 7C:

Referring to FIG. 7C, an electronic device LH 730 may be attached to a left hip joint of the user to assist a flexion motion and/or an extension motion of the hip joint and/or to assist the user to maintain a pose of the upper body. The electronic device LH 730 may measure a working range of the left hip joint, or measure an angle between a waist and the left thigh. In a situation in which the user walks, the electronic device LH 730 may calculate a gait cycle of the user by performing a recognition task. The electronic device LH 730 may be attached to the user to maintain a pose of the upper body of the user or to assist a motion of a left leg of the user.

The electronic devices of FIGS. 7A through 7C may be used independently, or may operate cooperatively by being physically coupled through connecting devices. The connecting devices may include devices configured to physically fasten the electronic devices or cables configured to connect the electronic devices.

Figure 7D:
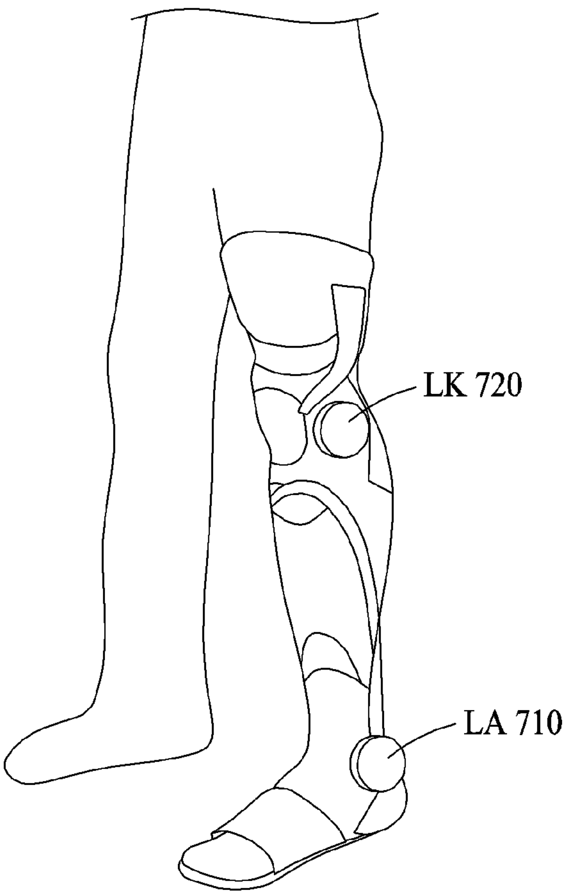

Referring to FIG. 7D, the user may wear the electronic device LA 710 and the electronic device LK 720 simultaneously. In this example, the electronic device LA 710 and the electronic device LK 720 may cooperatively assist motions of the entire left leg of the user.

For example, in a situation in which the user walks, the electronic device LK 720 may change the angle between the left thigh and the left shank based on whether the left leg lands measured by the electronic device LA 710. In this example, the electronic device LA 710 may perform a recognition task of determining whether the left leg lands by tracking a motion of the left ankle, and transmit a result of performing the recognition task to the electronic device LK 720. The electronic device LK 720 may perform a control task of changing the angle between the left thigh and the left shank based on a result of recognizing the current angle between the left thigh and the left shank and also based on the result of recognizing whether the left leg lands received from the electronic device LA 710.

Similarly, the electronic device LA 710 may determine a point in time at which a propulsion to be used for the user to walk is to be generated, based on whether the left leg lands and also based on the angle between the left thigh and the left shank measured by the electronic device LK 720.

In summary, when the electronic device LA 710 and the electronic device LK 720 detect a presence of each other, the electronic device LA 710 and the electronic device LK 720 may process information sensed by the electronic device LA 710 and the electronic device LK 720 in a form suitable for being utilized by each other, share the processed information, and cooperatively perform functions of the electronic device LA 710 and the electronic device LK 720 based on the shared information.

Even in a case of performing the same function, different recognition tasks may be performed, or different recognition results or control tasks may be shared based on a combination of electronic devices.

Figure 7E:

Referring to FIG. 7E, the user may wear the electronic device LA 710, and wear the electronic device LH 730 instead of the electronic device LK 720.

In a situation in which the user walks, the electronic device LA 710 may determine a point in time at which a propulsion to be used for the user to walk is to be generated, based on whether the left leg lands and the gait cycle measured by the electronic device LH 730. The electronic device LH 730 may change an angle of the hip joint based on an angle of the left hip joint and whether the left leg lands measured by the electronic device LA 710. That is, to cooperatively assist a walking motion of the user, the electronic device LH 730 may transmit the gait cycle calculated from the measured angle of the left hip joint to the electronic device LA 710, and the electronic device LA 710 may transmit whether the left leg lands to the electronic device LH 730.

When compared to the example of FIG. 7D, the electronic device LA 710 may receive the angle between the left thigh and the left shank measured by the electronic device LK 720 to perform a first control task in a situation in which the electronic device LA 710 and the electronic device LK 720 are connected, whereas the electronic device LA 710 may receive the gait cycle measured by the electronic device LH 730 to perform a second control task in a situation in which the electronic device LA 710 and the electronic device LH 730 are connected. That is, the electronic device LA 710 may select and perform one of the first control task and the second control task based on which one of the electronic device LK 720 and the electronic device LH 730 is connected to the electronic device LA 710. In addition, a different recognition result to be received by the electronic device LA 710 may be determined based on the control task selected by the electronic device LA 710.

The electronic devices may be worn on a right hip joint, a right knee, and a right ankle, in addition to the left hip joint, the left knee, and the left ankle to operate cooperatively with each other.

Figure 7F:
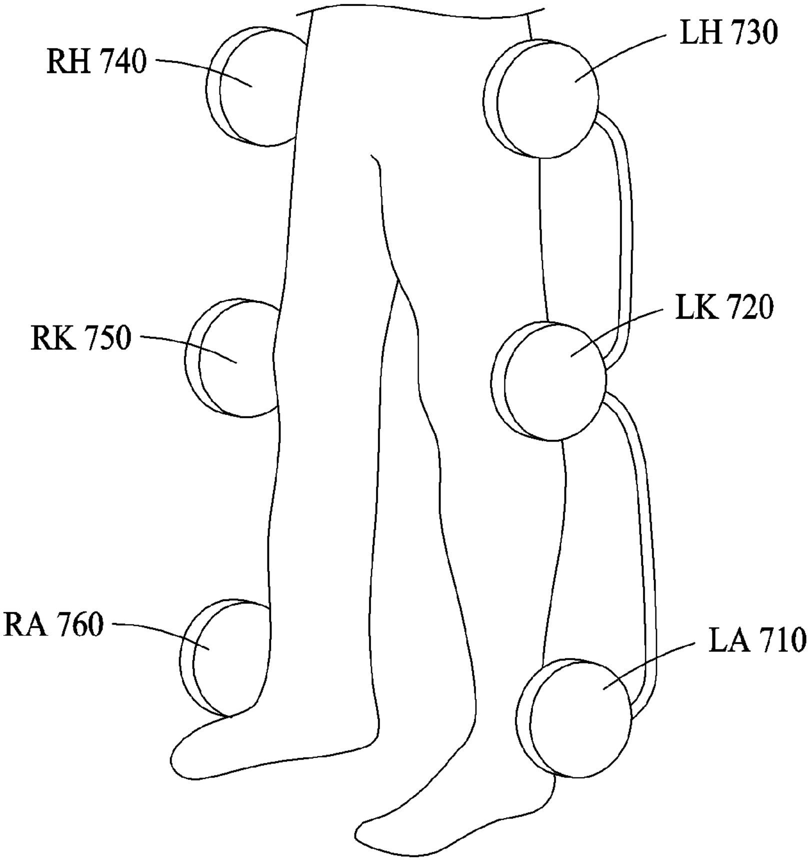

Referring to FIG. 7F, in addition to the electronic device LA 710, the electronic device LK 720, and the electronic device LH 730, an electronic device RH 740 to be attached to the right hip joint of the user, an electronic device RK 750 to be attached to the right knee of the user, and an electronic device RA 760 to be attached to the right ankle of the user are roughly illustrated. When F(X) denotes a flag indicating whether an electronic device X is connected, connection information of the electronic device LA 710, the electronic device LK 720, the electronic device LH 730, the electronic device RH 740, the electronic device RK 750, and the electronic device RA 760 may be expressed using a vector including six elements (F(LA), F(LK), F(LH), F(RH), F(RK), F(RA)).

Hereinafter, based on the connection information, functions to be performed cooperatively by the electronic devices of FIGS. 7A through 7F will be described in detail. Recognition tasks or control tasks to be performed by the electronic devices may be determined in view of resource states of the electronic devices.

Figure 8A:
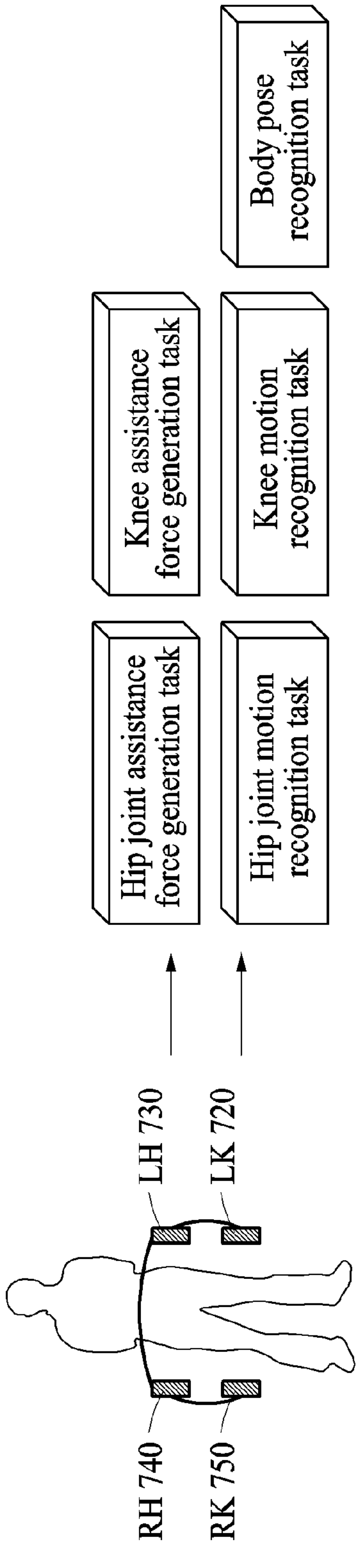
FIGS. 8A and 8B illustrate an operation of electronic devices determining recognition tasks or control tasks in view of resource states of the electronic devices, in an example in which a user wears a portion of the electronic devices of FIGS. 7A through 7F.
Figure 8B:
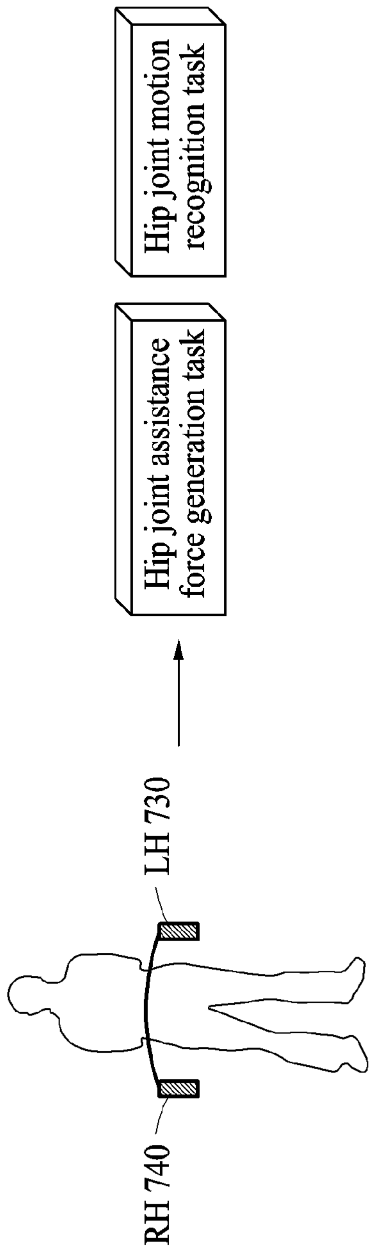

FIGS. 8A and 8B illustrate an operation of electronic devices determining recognition tasks or control tasks in view of resource states of the electronic devices, in an example in which a user wears a portion of the electronic devices of FIGS. 7A through 7F.

Referring to FIG. 8A, the user may wear the electronic device LK 720, the electronic device LH 730, the electronic device RH 740, and the electronic device RK 750. In this example, connection information of the electronic device LK 720, the electronic device LH 730, the electronic device RH 740, and the electronic device RK 750 may be determined to be (0, 1, 1, 1, 1, 0).

The electronic devices worn by the user may determine an electronic device to perform a recognition task based on the determined connection information. In the example of FIG. 8A, the electronic devices may select, based on the connection information, a hip joint motion recognition task, a knee motion recognition task, and a body pose recognition task from the hip joint motion recognition task, the knee motion recognition task, an ankle motion recognition task, the body pose recognition task, and a gait cycle recognition task. Furthermore, in view of the resource states of the electronic devices being connected, the electronic device LK 720 may be determined to perform the selected hip joint motion recognition task, the selected knee motion recognition task, and the selected body pose recognition task.

In this example, information sensed by the electronic device LH 730, the electronic device RH 740, and the electronic device RK 750 may be transmitted to the electronic device LK 720, and the electronic device LK 720 may recognize the hip joints, the knees, and the pose of the user based on the received information. A recognition result generated by the electronic device LK 720 recognizing the hip joints, the knees, and the pose of the user may be transmitted to the electronic device LH 730, the electronic device RH 740, and the electronic device RK 750.

The electronic devices worn by the user may determine an electronic device to perform a control task based on the determined connection information. In the example of FIG. 8A, the electronic devices may select, based on the connection information, a hip joint assistance force generation task and a knee assistance force generation task from among the hip joint assistance force generation task, the knee assistance force generation task, and an ankle assistance force generation task. Furthermore, in view of the resource states of the electronic devices being connected, the electronic device LH 730 may be determined to perform the selected hip joint assistance force generation task and the selected knee assistance force generation task.

In this example, a recognition result generated by the electronic device LK 720 recognizing the hip joints, the knees, and the pose of the user may be transmitted to the electronic device LH 730. The electronic device LH 730 may generate control signals to control drivers of the electronic device LK 720, the electronic device LH 730, the electronic device RH 740, and the electronic device RK 750 based on the recognition result. The generated control signals may be transmitted to the electronic device LK 720, the electronic device LH 730, the electronic device RH 740, and the electronic device RK 750, respectively. Thus, the electronic device LK 720, the electronic device LH 730, the electronic device RH 740, and the electronic device RK 750 may cooperatively assist motions of the hip joints and the knee joints.

Referring to FIG. 8B, the user may wear the electronic device LH 730 and the electronic device RH 740. Thus, connection information of the electronic device LH 730 and the electronic device RH 740 may be determined to be (0, 0, 1, 1, 0, 0).

The electronic device LH 730 and the electronic device RH 740 may select a recognition task and a control task based on the connection information (0, 0, 1, 1, 0, 0). In the example of FIG. 8B, the electronic device LH 730 and the electronic device RH 740 may select only a hip joint motion recognition task from among the hip joint motion recognition task, a knee motion recognition task, an ankle motion recognition task, a body pose recognition task, and a gait cycle recognition task. Further, the electronic device LH 730 and the electronic device RH 740 may select only a hip joint assistance force generation task from among the hip joint assistance force generation task, a knee assistance force generation task, and an ankle assistance force generation task.

Furthermore, the electronic device LH 730 and the electronic device RH 740 may determine electronic devices to perform the selected hip joint motion recognition task and the selected hip joint assistance force generation task. In the example of FIG. 8B, the hip joint motion recognition task of recognizing motions of both the left hip joint and the right hip joint may be determined to be performed by the electronic device LH 730, and the hip joint assistance force generation task of determining assistance forces of both the left hip joint and the right hip joint may be determined to be performed by the electronic device RH 740. In this example, a motion of the right hip joint measured by the electronic device RH 740 may be transmitted to the electronic device LH 730, and a control signal determined by the electronic device LH 730 may be transmitted to the electronic device RH 740. Thus, the electronic devices being connected to each other may use a resource of each other more efficiently.

As described above, an electronic device may include a high-performance processor to assist recognition tasks or control tasks to be performed by other electronic devices.

Figure 9:
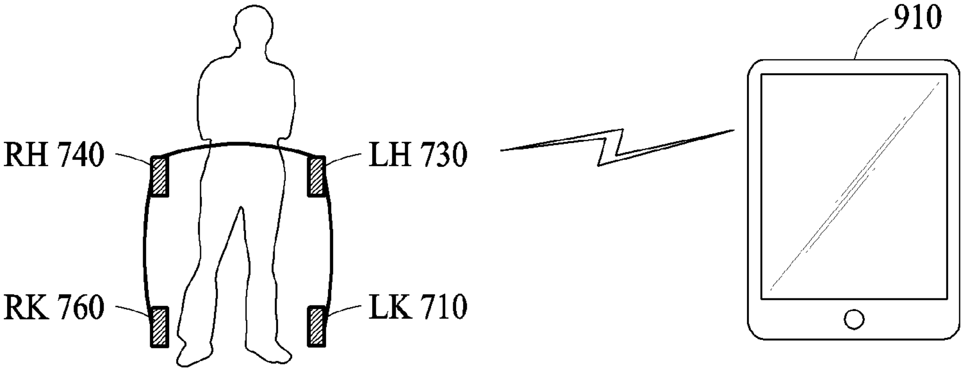
FIG. 9 illustrates an operation of a portion of the electronic devices of FIGS. 7A through 7F performing a recognition task or a control task by cooperating with an electronic device including a high-performance processor.

FIG. 9 illustrates an operation of a portion of the electronic devices of FIGS. 7A through 7F performing a recognition task or a control task by cooperating with an electronic device 910 including a high-performance processor.

Referring to FIG. 9, a user may wear the electronic device LA 710, the electronic device LH 730, the electronic device RH 740, and the electronic device RA 760.

Since the user wears the electronic devices that detect or control motions of hip joints and ankles, the electronic devices may determine to perform an ankle motion recognition task as a recognition task related to the ankles, and determine to perform a hip joint motion recognition task and a gait cycle recognition task as recognition tasks related to the hip joints. In addition, the electronic devices may determine to perform a pose recognition task as a recognition task to be performed by combining the motions of the ankles and the hip joints. In addition, the electronic devices may perform an error diagnosis task and a task scheduling. Further, the electronic devices may determine to perform an ankle assistance force generation task as a control task related to the ankles, and determine a hip joint assistance force generation task as a control task related to the hip joints. The electronic devices may assign the selected recognition tasks and the selected control tasks to the electronic devices in view of resource states of the electronic devices, similarly as described above.

Referring to FIG. 9, the electronic device 910 may be connected to the electronic device LA 710, the electronic device LH 730, the electronic device RH 740, and the electronic device RA 760.

The electronic device 910 may be an electronic device including a high-performance processor, and may include a cloud server, a desktop computer, and a mobile device carried by the user such as, for example, a smart phone, a smart pad, a smart watch, a personal digital assistant (PDA) or a laptop computer. In this example, the selected recognition tasks and the selected control tasks may be performed in view of the resource states of the electronic device LA 710, the electronic device LH 730, the electronic device RH 740, and the electronic device RA 760, and the resource state of the electronic device 910. For example, in a case in which the pose recognition task to be performed by combining the motions of the ankles and the hip joints requires a great computation, the pose recognition task may be determined to be performed by the electronic device 910.

As discussed above, each of the electronic devices may include a discrete battery used to power the driver associated with the electronic device. In some example embodiments, the system including the plurality of electronic devices may reduce power consumption, thus extending the life of the batteries, by setting various ones of the electronic devices to sleep mode based on data from the sensors. For example, when the data from the sensors indicates a user of the electronic devices is at rest (e.g., sitting or lying down), one or more of the electronic devices may enter the sleep mode.

Further, in some example embodiments, the electronic devices may operate cooperatively such that when one of the electronic devices indicates that its associated power supply is low, other ones of the electronic devices may compensate for the low resourced electronic device. For example, if the electronic device associated with a knee of the user is low in resources, the electronic device associated with the hip joint of the user may overextend a hip joint of a user to reduce a range of motion needed by the driver of the knee joint of the user.

Further still, as discussed above, in some example embodiments, the electronic devices may be configured to perform computation offloading to offload processing associated with performing an operation to one or more of the other electronic devices and/or to a remote server. The electronic devices may selectively determine whether to perform computation offloading based on a level of power associated with the battery of the electronic device. For example, the electronic devices may perform computation offloading when the power level of the electronic device falls below a threshold.

In summary, electronic devices may determine tasks of interpreting information sensed by sensors, for example, recognition tasks, and operations to be performed by the electronic devices, for example, control tasks, based on types of connected electronic devices. Information sensed by one of the connected electronic devices may be shared with another electronic device, and the other electronic device may perform an operation based on the shared information. A task of interpreting information sensed by a sensor of one of the connected electronic devices may be performed based on a format suitable for being used by another electronic device. Furthermore, the electronic devices may select an electronic device to perform the determined recognition tasks and the determined control tasks based on resource states of the electronic devices.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling electronic devices, the method comprising: detecting a presence of the electronic devices at relatively different positions on a body of a user, the electronic devices being modular robots configured to assist movements of the user; determining operations performable by the electronic devices based on connection information associated with the detected electronic devices, the connection information including flags arranged based on types of the electronic devices; obtaining information associated with the operations from the electronic devices; and performing the operations based on the obtained information.

2. The method of claim 1, wherein the detecting the presence comprises: generating the connection information such that the flags indicate whether the electronic devices are connected to each other.

3. The method of claim 1, wherein the determining the operations comprises: selecting one of the electronic devices to perform a computation associated with the operations based on resource states of the electronic devices.

4. The method of claim 1, wherein the obtaining the information comprises: obtaining the information from a first sensor and a second sensor, the first sensor being associated with a first electronic device of the electronic devices and the second sensor being associated with a second electronic device of the electronic devices, wherein the obtained information is used to perform an operation of the first electronic device.

5. The method of claim 1, wherein the performing the operations comprises: determining whether to perform the operations based on connection states included in the connection information.

6. A method of controlling an electronic device, the method comprising: detecting another electronic device connected to the electronic device, the electronic device and the another electronic device positionable on relatively different positions on a body of a user, the electronic device and the another electronic device being modular robots configured to assist movements of the user; identifying an operation performable by the electronic device and the another electronic device based on connection information including flags arranged based on a type of the another electronic device; obtaining information associated with the operation from a first sensor and a second sensor, the first sensor being associated with the electronic device and the second sensor being associated with the another electronic device; and performing the operation based on the obtained information.

7. The method of claim 6, wherein the detecting comprises: determining the connection information such that the connection information indicates whether the another electronic device is connected to the electronic device based on a type of the another electronic device.

8. The method of claim 7, wherein the detecting comprises: transmitting the connection information to the another electronic device.

9. The method of claim 6, wherein the detecting comprises: detecting the another electronic device connected to the electronic device based on the connection information received from the another electronic device.

10. The method of claim 6, wherein the identifying the operation comprises: selecting one of the electronic device and the another electronic device to perform a computation associated with the operation based on resource states of the electronic device and the another electronic device.

11. The method of claim 6, wherein the information obtained from the first sensor and the second sensor relate to environments surrounding the first sensor and the second sensor, respectively.

12. The method of claim 6, wherein the obtaining comprises: transmitting the information to the another electronic device.

13. The method of claim 6, wherein the performing the operation comprises: measuring a connection state between the electronic device and the another electronic device to perform the operation.

14. An electronic device, comprising: a first sensor; a communicator configured to communicate with another electronic device connected to the electronic device, the electronic device and the another electronic device positionable on relatively different positions on a body of a user, the electronic device and the another electronic device being modular robots configured to assist movements of the user; and a controller configured to control the electronic device by, identifying an operation performable by the electronic device and the another electronic device based on connection information including flags arranged based on a type of the another electronic device, obtaining information associated with the operation from the first sensor included in the electronic device and a second sensor associated with the another electronic device, and performing the operation based on the obtained information.

15. The electronic device of claim 14, wherein the controller is configured to determine the connection information such that the connection information indicates whether the another electronic device is connected to the electronic device based on a type of the another electronic device.

16. The electronic device of claim 15, wherein the communicator is configured to transmit the connection information to the another electronic device.

17. The electronic device of claim 14, wherein the controller is configured to select one of the electronic device and the another electronic device to perform a computation associated with the operation based on resource states of the electronic device and the another electronic device.

18. The electronic device of claim 14, wherein the information obtained from the first sensor and the second sensor relate to environments surrounding the first sensor and the second sensor, respectively.

19. The electronic device of claim 14, wherein the controller is configured to transmit, via the communicator, the information to the another electronic device.

20. The electronic device of claim 14, wherein the communicator is configured to transmit an identifier of the electronic device to the another electronic device.

* * * * *